(12) United States Patent
Hüttner et al.

(10) Patent No.: US 8,246,232 B2
(45) Date of Patent: Aug. 21, 2012

(54) OPTICAL WAVEGUIDE AND OPTICAL APPARATUS

(75) Inventors: Josef Hüttner, Regensburg (DE); Julius Muschaweck, Gauting (DE); Georg Bogner, Lappersdorf (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 354 days.

(21) Appl. No.: 12/442,592

(22) PCT Filed: Sep. 21, 2007

(86) PCT No.: PCT/DE2007/001713
§ 371 (c)(1),
(2), (4) Date: Dec. 21, 2009

(87) PCT Pub. No.: WO2008/040306
PCT Pub. Date: Apr. 10, 2008

(65) Prior Publication Data
US 2010/0103696 A1 Apr. 29, 2010

(30) Foreign Application Priority Data
Sep. 29, 2006 (DE) .......... 10 2006 046 235

(51) Int. Cl.
*F21V 7/04* (2006.01)
(52) U.S. Cl. ......... 362/608; 362/610; 362/612; 362/621
(58) Field of Classification Search .................. 362/608, 362/610, 612, 613, 621
See application file for complete search history.

(56) References Cited

U.S. PATENT DOCUMENTS

| | | | |
|---|---|---|---|
| 2,224,178 A | 12/1940 | Bitner | |
| 4,264,948 A | 4/1981 | Cherouge | |
| 4,734,836 A | 3/1988 | Negishi | |
| 4,907,044 A | 3/1990 | Schellhorn et al. | |
| 5,485,317 A | 1/1996 | Perissinotto et al. | |
| 5,526,190 A | 6/1996 | Hubble et al. | |
| 5,553,174 A | 9/1996 | Snyder | |
| 5,757,557 A | 5/1998 | Medvedev et al. | |
| 6,478,453 B2 | 11/2002 | Lammers et al. | |
| 6,568,822 B2 | 5/2003 | Boyd et al. | |
| 6,647,199 B1 | 11/2003 | Pelka et al. | |

(Continued)

FOREIGN PATENT DOCUMENTS
DE  100 51 464  5/2002
(Continued)

OTHER PUBLICATIONS

Translation of International Preliminary Report on Patentability for International Application No. PCT/DE2007/001713, issued on Apr. 7, 2009.

(Continued)

*Primary Examiner* — Evan Dzierzynski
(74) *Attorney, Agent, or Firm* — Fish & Richardson P.C.

(57) ABSTRACT

Described is an optical waveguide having a main direction of extension, at least one radiation entrance face, and a radiation exit face that extends longitudinally to the main direction of extension, wherein at least one radiation entrance face extends transversely to the main direction of extension, and the at least one radiation entrance face has two convexly curved subregions that are connected to each other by a kink-like or concavely shaped indentation. An optical device formed with such a waveguide is also described, as is a display device.

19 Claims, 3 Drawing Sheets

U.S. PATENT DOCUMENTS

| | | | |
|---|---|---|---|
| 6,741,324 | B1 | 5/2004 | Kim |
| 7,465,074 | B2 * | 12/2008 | Blumel ............... 362/335 |
| 2001/0007527 | A1 | 7/2001 | Lammers et al. |
| 2002/0018350 | A1 | 2/2002 | Lepley et al. |
| 2002/0080615 | A1 | 6/2002 | Marshall et al. |
| 2003/0161137 | A1 | 8/2003 | Schach et al. |
| 2003/0202241 | A1 | 10/2003 | Blumel |
| 2004/0062055 | A1 | 4/2004 | Rozenberg et al. |
| 2004/0170018 | A1 | 9/2004 | Nawashiro |
| 2004/0264185 | A1 | 12/2004 | Grotsch et al. |
| 2005/0185419 | A1 * | 8/2005 | Holman et al. ........ 362/561 |
| 2005/0190578 | A1 * | 9/2005 | Miyashita ............. 362/615 |
| 2005/0218790 | A1 | 10/2005 | Blumel |
| 2006/0018010 | A1 * | 1/2006 | Blumel ............... 359/351 |
| 2006/0158903 | A1 * | 7/2006 | Yue et al. ............. 362/629 |
| 2007/0041216 | A1 * | 2/2007 | Yue .................. 362/620 |

FOREIGN PATENT DOCUMENTS

| | | |
|---|---|---|
| DE | 102 58 193 | 7/2004 |
| EP | 0 987 577 | 3/2000 |
| JP | 10/293202 | 11/1998 |
| JP | 11-95034 | 4/1999 |
| JP | 2000-67624 | 3/2000 |
| JP | 2001-345007 | 12/2001 |
| JP | 2004193623 | 7/2004 |
| WO | WO 98/12757 | 3/1998 |
| WO | WO 2005/080863 | 9/2005 |
| WO | 2005/103562 | 11/2005 |

OTHER PUBLICATIONS

Licht, Planung Design Technik Haldel "light + building", März 2004, 56. Jahrgang, ISSN 0024/2861, Pflaum Verlag GmbH & Co. KG. pp. 172-174, 176, 178-181, 260.

Miller, W., "The Formula for Curvature," dated Oct. 26, 2007, available online at http://www.ima.umn.edu/~miller/1372curvature.pdf.

I. Schnitzer et al., ",30% external quantum efficiency from surface textured, thin-film light-emitting diodes, *Applied Physics Letters*, 63(16), Oct. 18, 1993, pp. 2174-2176.

Definition of "aspheric" from the Photonics Dictionary (Laurin Publishing, 1996-2009). available online at http://www.photonics.com/Splash.aspx?PageID=6.

Verordnung uber Arbeitsstatten, Arbeitsstättenverordnung, § 7, Abschnitt (4), No. 4, (1975).

Dattenblatt Luminaire dimensions: "emLED-s (stand alone unit)", Copyright 2000-2004 Fagerhults Belysning AB.

Dattenblatt Emergency unit F: "emLED-s (stand alone unit)", p. 1, www.fagerhult.com, May 3, 2004.

European Search Report for Application No. 05015789.0-2217 dated Sep. 21, 2005.

International Search Report for International Application No. PCT/DE2007/001713 dated Feb. 1, 2008.

Translation of the Notification of Reasons for Refusal (Type I Office Action) for Japanese Patent Application No. 2009-529524 dated Mar. 28, 2012.

* cited by examiner

OPTICAL WAVEGUIDE AND OPTICAL APPARATUS

CROSS REFERENCE TO RELATED APPLICATION

This application is the National Stage International Application No. PCT/DE2007/001713, filed on Sep. 21, 2007, which claims priority to German Patent Application Serial No. 10 2006 046 235.1, filed on Sep. 29, 2006. The contents of these applications are hereby incorporated by reference in their entireties.

BACKGROUND

The present application is directed to an optical waveguide and to an optical device formed with an optical waveguide.

Such waveguides are used, for example, for backlighting arrangements, e.g. for display devices. In such applications, the light from a light source must be coupled into the waveguide as efficiently as possible. Propagation within the waveguide obliquely to the plane of the waveguide is also advantageous.

SUMMARY

It is an object of the present invention to specify a waveguide that permits efficient incoupling on the incoupling side and high luminance on the outcoupling side. The radiation coupled into the waveguide is, in particular, to be distributed on the radiation outcoupling surface as efficiently and uniformly as possible. It is a further object of the present invention to specify an optical device comprising such a waveguide.

Provided according to the invention is an optical waveguide having a main direction of extension, at least one radiation entrance face, and a radiation exit face that extends longitudinally to the main direction of extension, wherein at least one radiation entrance face extends transversely to the main direction of extension, and said at least one radiation entrance face has two convexly curved subregions that are connected to each other by a kink-like or concavely shaped indentation.

Advantageously, the convexly curved subregions of the at least one radiation entrance face, in combination with the kink-like or concavely shaped indentation, cause the incoupled radiation to be deflected directly or indirectly to the radiation exit face, with the propagation of radiation fractions taking place particularly along the main direction of extension of the waveguide and thus being reduced in the direction of a lateral face disposed opposite the at least one radiation entrance face.

In an advantageous development, associated with the waveguide along the main direction of extension is a center plane that pierces the at least one radiation entrance face in the region of the indentation. The at least one radiation entrance face and the waveguide can further be implemented symmetrically to the center plane. This embodiment advantageously causes the radiation above and below the center plane to be propagated in the waveguide in the same manner, resulting in a uniform distribution of the radiation.

In a preferred embodiment of the waveguide, one the convex subregions is, or both of the convex subregions are, cylindrically shaped. Advantageously, the propagation of radiation along the main direction of extension is efficiently suppressed in this way, resulting in a uniform distribution of the radiation.

In a preferred embodiment of the waveguide, the waveguide is implemented as planar, particularly as flat. A planar implementation is to be understood herein as meaning a substantially flat shape for the waveguide, although a slight curvature or bowing is acceptable. Such waveguides are suitable in particular for backlighting flat or slightly curved display devices, such as LCD displays or vehicle instruments, for example. Particularly in the latter case, a slight curvature or bowing may actually be useful.

In one advantageous development, the waveguide is implemented as wedge-shaped. A wedge-shaped implementation is to be understood herein essentially as a wedge-shaped thickness of the waveguide, in which case the thickness of the waveguide decreases along the main direction of extension of the waveguide with increasing distance from the radiation entrance face. A particularly uniform luminance is obtained at the radiation exit face with such a waveguide. In particular, the radiation coupled into the waveguide is thereby distributed on the radiation exit face as evenly as possible.

In a preferred embodiment of the waveguide, the at least one radiation entrance face of the waveguide at least locally comprises a structuring. This structuring is preferably implemented transversely to the direction of extension of the indentation. The structuring can, for example, include a plurality of grooves or prominences that are arranged in the same direction, particularly transversely to the direction of extension of the indentation. By means of a structuring of this kind, a radiation bundle coupled into the waveguide can be broadened in the direction of extension of the indentation, thus enhancing uniform distribution of the incoupled radiation on the radiation exit face.

A boundary surface of the waveguide that is disposed opposite the radiation exit face is preferably reflectively configured or/and provided with a reflector layer. This boundary surface may, for example, be implemented as totally reflective. Alternatively or additionally, it is advantageous for the boundary surface to be coated with a reflector layer, for instance a metal layer or a metal oxide layer. Such a boundary surface deflects the incident radiation advantageously in the direction of the radiation exit face.

At least one boundary surface of the waveguide that is adjacent the radiation exit face is preferably configured as reflective or/and provided with a reflector layer. This boundary surface may, for example, be implemented as totally reflective. Alternatively or additionally, it is advantageous for the boundary surface to be coated with a reflector layer, for instance a metal layer or a metal oxide layer. Such a boundary layer deflects the incident radiation advantageously in the direction of the radiation exit face. Particularly advantageously, both the boundary surface of the waveguide that is opposite the radiation exit face and additionally the boundary surfaces of the waveguide that are adjacent the radiation exit face, on which no radiation sources are disposed, are reflectively configured or/and provided with a reflector layer.

In an advantageous improvement, the waveguide can be fabricated in one piece, preferably in an injection molding process. Materials that have proven advantageous for this purpose are, in particular, plastics, particularly preferably PMMA. Alternatively, the waveguide can contain polycarbonate.

In a preferred embodiment of the waveguide, the waveguide at least locally comprises outcoupling structures. To bring about the most uniform possible distribution of the radiation on the radiation exit face, the number of such outcoupling structures increases along the main direction of extension of the waveguide with increasing distance from the radiation entrance face. Such a waveguide achieves the most uniform possible luminance at the radiation outcoupling face. Suitable candidates for use as outcoupling structures are preferably three-dimensional outcoupling structures, particularly preferably spherical cap or pyramidal shapes. Such three-dimensional outcoupling structures may be directed into the waveguide, or they may be directed out of the waveguide, as prominences. Alternatively, the outcoupling structures can be implemented as a printed color raster, as dots of color, or as transverse grooves.

An optical device formed with an optical waveguide of the aforesaid kind has at least one radiation source on the side comprising the at least one radiation entrance face, such that the at least one radiation entrance face is disposed after the radiation source in the emission direction.

An advantageous development of the optical device provides that viewed in the main direction of extension of the waveguide, the distance of the radiation source from the waveguide is smaller than a dimension of the waveguide perpendicular to the main direction of extension of the waveguide. The directed deflection of the incoupled radiation brought about by the above-described design for the radiation entrance face makes it possible to give the optical device an advantageously compact construction.

The length of the radiation source is preferably small compared to the length of the radiation entrance face of the waveguide. "Length of the radiation source" is to be understood herein as meaning the effective size of the radiation source, the effective size being defined in this case on the basis of the radiation source apart from any housing in which it may be disposed.

Taking this idea further, additional optical elements between the radiation source and the radiation entrance face of the waveguide can be dispensed with. Particularly preferably, the gap between the radiation source and the radiation entrance face of the waveguide contains only air.

In a preferred embodiment of the optical device, the radiation source is an LED, particularly an LED component or an LED chip. Such radiation sources are distinguished by relatively low power consumption and correspondingly high efficiency, ease of control, and, in particular, compact construction. The latter is particularly advantageous for creating space-saving optical devices, such as those used, for example, in the backlighting of cell phones or portable computers.

In a particularly preferred embodiment of the optical device, the radiation source is an LED that emits mixed radiation having a color space in the white region of the CIE chromaticity diagram.

In the sense of the invention, the "color space" defines the numerical values that describe the color of the light emitted by the component in the CIE chromaticity diagram.

When used in combination with a white LED, as a radiation source, that emits radiation in different wavelength ranges, for example in the blue and the yellow wavelength ranges, with different directional distributions, and thus has color structures in its emission profile, the optical device according to the invention advantageously serves to propagate the radiation in the waveguide in such a way that the different directional distributions of different wavelength ranges cancel each other out, thus yielding a uniform distribution of the radiation.

Other features, preferences and utilities of the present invention will emerge from the following description of two exemplary embodiments, taken in conjunction with FIGS. 1 to 3.

DESCRIPTION OF THE DRAWINGS

Like or like-acting elements have been given the same reference characters in the figures.

DETAILED DESCRIPTION

Figure 1:
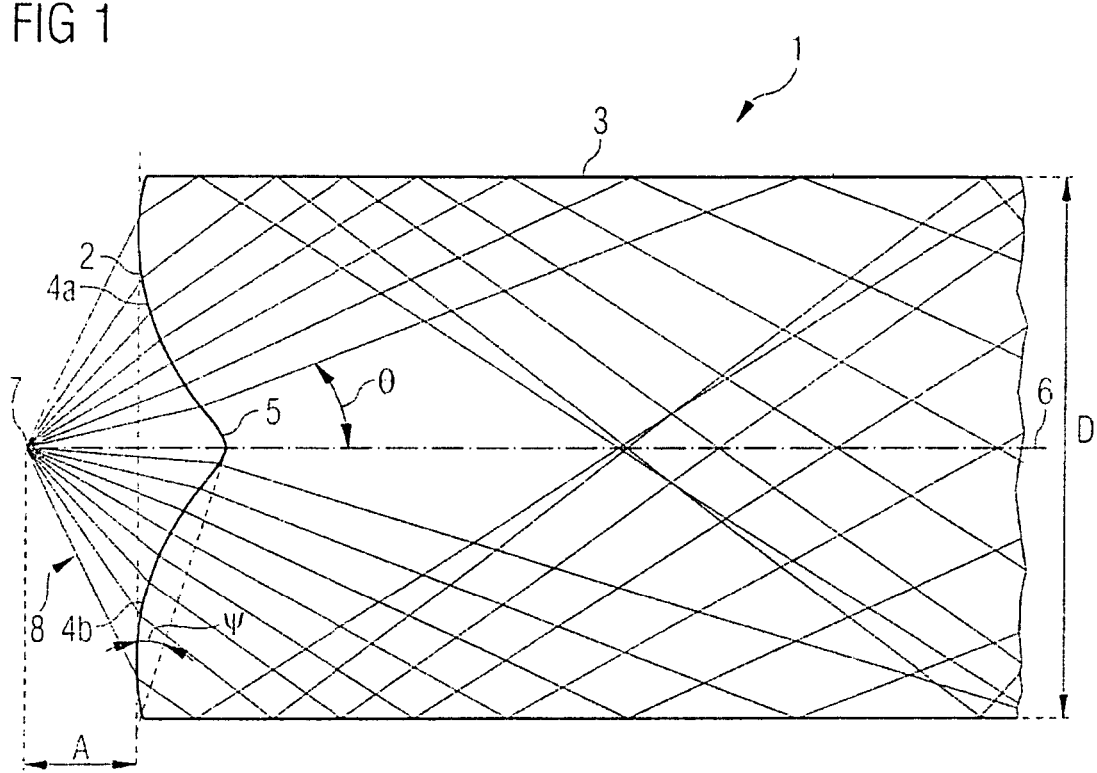
FIG. 1 is a schematic sectional view of a first exemplary embodiment of an optical device according to the invention comprising an optical waveguide according to the invention.

The optical device shown in FIG. 1 includes an optical waveguide 1 having a main direction of extension and a radiation entrance face 2 that extends transversely to the main direction of extension. The waveguide 1 also has a radiation exit face 3 that extends along the main direction of extension.

The radiation entrance face 2 is configured with two convex, preferably cylindrical, subregions 4a, 4b, which are connected to each other by a concavely curved indentation 5. The radius of curvature of the concavely shaped indentation can also be arbitrarily selected, such that in the limiting case the indentation is kink-like, i.e., it has an apex that is oriented toward the waveguide body. It is preferable for the radius of curvature of the indentation to be as small as possible and its apex thus as sharp as possible, since the propagation of radiation along the main direction of extension is efficiently suppressed in this way.

The angle $\psi$ between a vertical plane adjacent the waveguide and the connecting line between the indentation 5 and the point of intersection of the vertical plane with one of the convex subregions is preferably between 15° and 25°, particularly preferably 20°.

The waveguide 1 is preferably configured as flat in the main direction of extension, as illustrated. The waveguide can further have a center plane 6 with respect to which the waveguide and particularly the convex subregions 4a, 4b of the radiation entrance face 2 are symmetrically implemented.

A radiation source 7, preferably an LED, is provided at the radiation entrance face. It is also feasible, of course, to use a plurality of LEDs, which can be arranged, for example, in a row-like manner in the direction of extension of the indentation. Alternatively, it is also feasible to provide a plurality of radiation entrance faces, each of which has one or more LEDs disposed in front of it. Particularly preferably, there are two mutually opposite radiation entrance faces, at each of which one or more LEDs are disposed.

The beam path of the radiation generated by the radiation source is depicted schematically in the form of plural sub-beams 8. These sub-beams are refracted by the convexly shaped subregions 4a, 4b of the radiation entrance face toward the radiation exit face 3 or toward the boundary surface of the waveguide that lies opposite the radiation exit face 3. Propagation along the main direction of extension or the center plane 6 of the waveguide is suppressed in this way.

Propagation along the main direction of extension is disadvantageous for backlighting purposes, since radiation that propagates parallel to the center plane 6 interacts very little with the radiation exit face or the opposite boundary surface, and thus does not, without further intervention, impinge on the radiation exit face 3 and contribute to the backlighting. The greater the amount of radiation emitted in this direction by the radiation source, the more deleterious this effect.

The design imparted to the entrance face of the waveguide makes it possible to give the optical device a compact construction, and in particular to select a distance between the radiation source and the waveguide that is advantageously small. "Distance" is to be understood here as distance A, viewed in the vertical direction, i.e., the distance between the radiation source and a vertical plane adjacent the waveguide. In particular, this distance can be smaller than a vertical dimension of the waveguide, such as its thickness D.

Figure 2A:
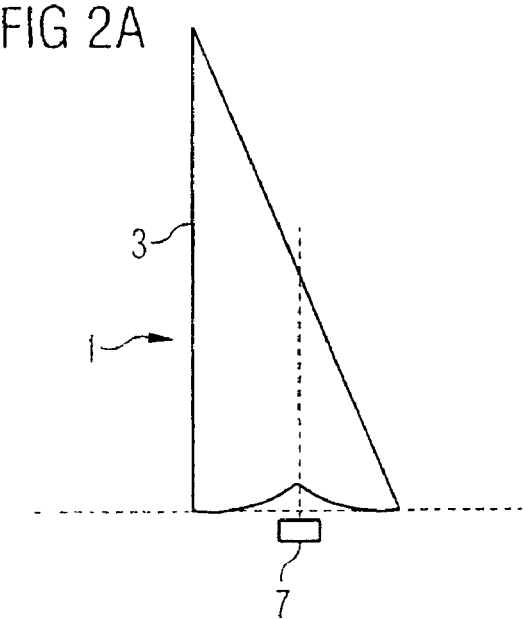
FIG. 2 is, in each case, a schematic sectional view of another exemplary embodiment of an optical device according to the invention comprising an optical waveguide according to the invention.

FIG. 2a represents another exemplary embodiment of an optical device comprising an optical waveguide. The optical device illustrated in FIG. 2 differs from the optical device of FIG. 1 in that the waveguide 1 is implemented as wedge-shaped. A wedge-shaped implementation is to be understood in this context essentially as a wedge-shaped thickness of the waveguide, in which the thickness of the waveguide 1 along the main direction of extension of the waveguide 1 decreases with increasing distance from the radiation entrance face 2. Such a waveguide yields the most uniform possible luminance at the radiation exit face 3. In particular, the radiation coupled into the waveguide 1 is distributed as evenly as possible on the radiation exit face 3.

Figure 2B:
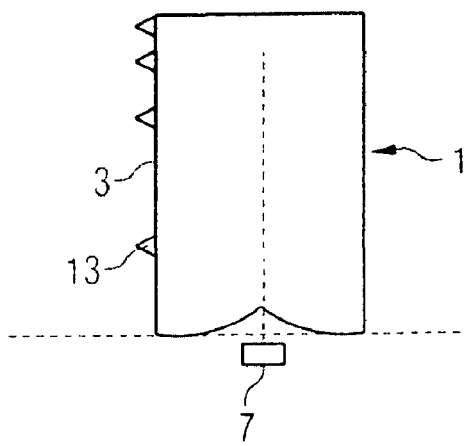

In FIG. 2b, to obtain the most uniform possible luminance at the radiation exit face 3, outcoupling structures 13 are introduced into the waveguide 1, for example by being formed on the radiation exit face 3. The outcoupling structures 13 can additionally or alternatively be disposed on the radiation exit face 3. Particularly suitable as outcoupling structures 13 are preferably three-dimensional outcoupling structures 13, particularly preferably spherical cap or pyramidal shapes. Such three-dimensional outcoupling structures 13 may be directed into the waveguide 1, or they may be directed out of the waveguide 1, as prominences. Alternatively, the outcoupling structures can be implemented as a printed color raster, as dots of color, or as transverse grooves. To obtain the most uniform possible luminance at the radiation exit face 3, the number of such outcoupling structures 13 increases along the main direction of extension of the waveguide 1 with increasing distance from the radiation entrance face 2.

Figure 3:
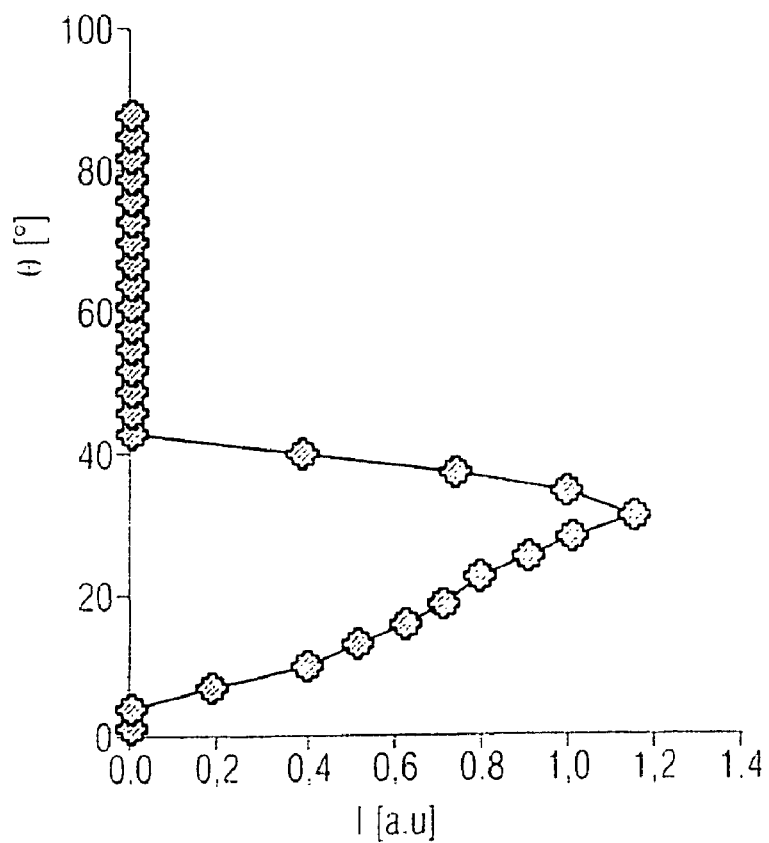
FIG. 3 is a graphic representation of the luminance distribution immediately behind the radiation entrance face of an exemplary embodiment corresponding to FIG. 1.

FIG. 3 shows the luminance distribution obtained immediately behind the radiation entrance face in an optical waveguide corresponding to FIG. 1, as determined by a simulation calculation.

The basic assumptions of the simulation calculation were a waveguide with a thickness D of approximately 2 mm and an LED chip having an edge length of approximately 500 μm and an approximately Lambertian emission characteristic, disposed a distance A of approximately 0.4 mm in front of the waveguide.

Plotted in FIG. 3 is the radiation distribution within the waveguide, the luminance I in arbitrary units being plotted against the associated angle Θ of the emission direction relative to the center plane 6. An angle of 0° here represents propagation of the particular radiation fraction parallel to the center plane 6.

As FIG. 3 shows, the radiation distribution obtained is relatively low along the center plane 6, and thus in the main direction of extension of the waveguide, and increases with increasing angle, up to an angle of approximately 30°. The main fraction of the radiation in this case is collimated into a radiation bundle whose propagation angle forms an angle of approximately 25° with the center plane. An angle in the range between 20° and 30° has in general proven advantageous.

The waveguide further has an advantageously high incoupling efficiency, i.e., a purely geometrical incoupling efficiency of about 90%, or an incoupling efficiency of about 85% if the reflection losses associated with incoupling are factored in.

Finally, a waveguide of the illustrated design can be fabricated in an injection molding process without particular technical expenditure. It is particularly advantageous for the waveguide to be implemented in one piece. Materials consisting of plastic, preferably PMMA, are particularly suitable for this purpose. The waveguide can alternatively contain polycarbonate.

Figure 4:
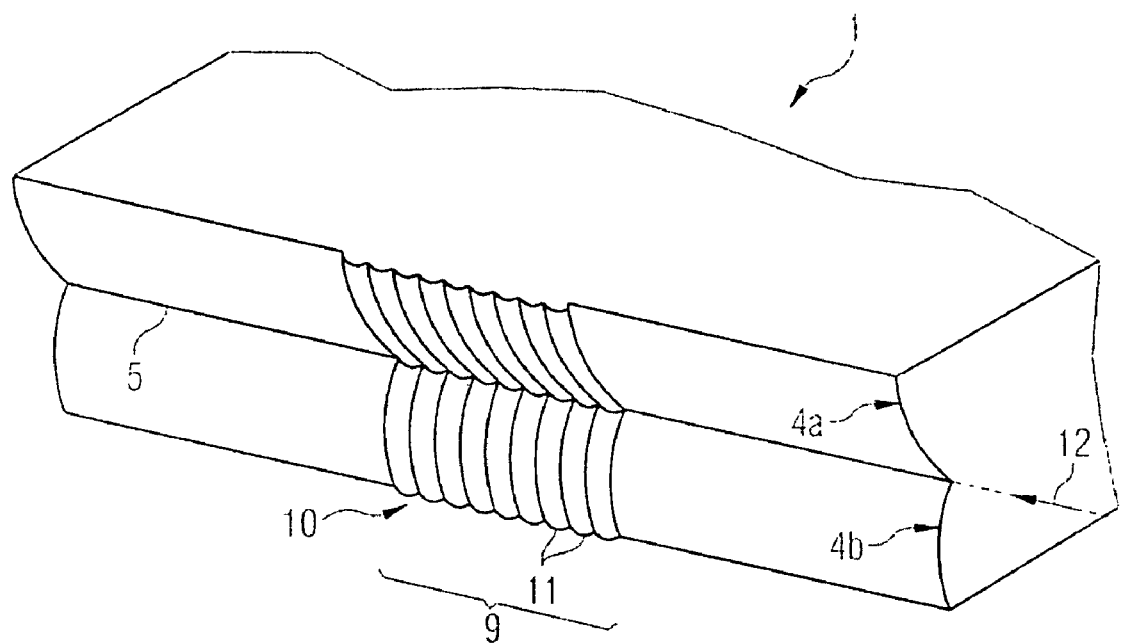
FIG. 4 is a schematic perspective detail view of a third exemplary embodiment of an optical waveguide according to the invention.

FIG. 4 depicts a third exemplary embodiment of the optical waveguide in a detail view. The design of the radiation entrance face, particularly the conformation of the convex subregions 4a, 4b and the indentation 5 interconnecting these subregions, is largely the same as in the case of the waveguide illustrated in FIG. 1 or 2.

In contradistinction thereto, the radiation entrance face 2 comprises, in the region provided to serve as the entrance region 9 for the radiation to be coupled into the waveguide, a structuring 10 in the form of a corrugation, in which the individual grooves 11 of the corrugation are disposed transversely to the direction of extension 12 of the indentation 5 interconnecting the two subregions 4a, 4b.

The entrance-side radiation bundle from the radiation source is thereby broadened in the direction of extension of the indentation, thus resulting in an advantageously uniform distribution of the incoupled radiation in the lateral direction.

The invention is not limited by the description made with reference to the exemplary embodiments. Rather, the invention encompasses any novel feature and any combination of features, including in particular any combination of features recited in the claims, even if that feature or combination itself is not explicitly mentioned in the claims or exemplary embodiments.

The invention claimed is:

1. An optical waveguide having a main direction of extension, at least one radiation entrance face, and a radiation exit face that extends longitudinally to said main direction of extension, wherein:
   at least one radiation entrance face extends transversely to said main direction of extension, and said at least one radiation entrance face has two convexly curved subregions that are connected to each other by a concavely shaped indentation; and a center plane associated with said waveguide extends along said main direction of extension and pierces said at least one radiation entrance face in the region of said indentation; wherein the at least one radiation entrance face is perpendicular to the radiation exit face.

2. The waveguide as in claim 1, wherein said at least one radiation entrance face is implemented symmetrically to said center plane.

3. The waveguide as in claim 1, wherein one of said convex subregions or both of said convex subregions are cylindrically shaped.

4. The waveguide as in claim 1, wherein said waveguide is implemented as planar, particularly as flat.

5. The waveguide as in claim 1, wherein said waveguide is implemented as wedge-shaped.

6. The waveguide as in claim 1, wherein said at least one radiation entrance face at least locally comprises a structuring.

7. The waveguide as in claim 6, wherein said structuring includes a plurality of grooves or prominences that are arranged in the same direction and transversely to the direction of extension of said indentation.

8. The waveguide as in claim 1, wherein a boundary surface of said waveguide that is disposed opposite said radiation exit face is reflectively implemented and/or provided with a reflector layer.

9. The waveguide as in claim 1, wherein at least one boundary surface of said waveguide that is adjacent said radiation exit face is reflectively implemented and/or provided with a reflector layer.

10. The waveguide as in claim 1, wherein said waveguide can be fabricated in one piece, preferably in an injection molding process.

11. The waveguide as in claim 1, wherein said waveguide comprises outcoupling structures.

12. The waveguide as in claim 11, wherein the number of said outcoupling structures increases along said main direction of extension of said waveguide with increasing distance from said radiation entrance face.

13. An optical device comprising:
the waveguide as in claim 1; and
a radiation source,
wherein said waveguide is positioned so that radiation emitted from said radiation source is incident upon said at least one radiation entrance face.

14. The optical device as in claim 13, wherein, viewed in said main direction of extension of said waveguide, a distance of said radiation source from said waveguide is smaller than a dimension of said waveguide that is perpendicular to said main direction of extension of said waveguide.

15. The optical device as in claim 13, wherein bounded by said radiation entrance face and said radiation source is a gap that is free of optical elements, particularly lenses and/or mirrors.

16. The optical device as in claim 13, wherein said radiation source is an LED, particularly an LED component or an LED chip.

17. The optical device as in claim 16, wherein said LED is a thin-film LED.

18. The optical device as in claim 13, wherein said radiation source has, as an approximation, a Lambertian emission characteristic.

19. A display device comprising a display element, such as an LCD display, and an optical device as in claim 13 for backlighting said display element.

* * * * *